United States Patent

Yamaki et al.

Patent Number: 5,418,783
Date of Patent: May 23, 1995

[54] COMMON CHANNEL SIGNAL EXTRACTION/INSERTION DEVICE

[75] Inventors: Masateru Yamaki; Touru Sogabe, both of Kamakura, Japan

[73] Assignee: Mitsubishi Denki Kabushiki Kaisha, Tokyo, Japan

[21] Appl. No.: 992,060

[22] Filed: Dec. 17, 1992

[30] Foreign Application Priority Data

Dec. 19, 1991 [JP] Japan ................... 3-336609

[51] Int. Cl.⁶ .................. H04J 3/12; H04J 3/22
[52] U.S. Cl. ................ 370/84; 370/110.1; 370/112
[58] Field of Search ............. 370/84, 112, 110.1, 370/74.1, 85.1, 85.2, 66, 60, 58.1, 58.2, 55

[56] References Cited

U.S. PATENT DOCUMENTS

| | | | |
|---|---|---|---|
| 4,430,734 | 2/1984 | Hubbard | 370/112 |
| 4,547,877 | 10/1985 | Lehman et al. | 370/84 |
| 4,685,101 | 8/1987 | Segal et al. | 370/84 |
| 4,701,913 | 10/1987 | Nelson | 370/110.1 |
| 4,803,726 | 2/1989 | Levine et al. | 370/84 |
| 5,020,053 | 5/1991 | Ishikawa et al. | 370/110.1 |
| 5,060,239 | 10/1991 | Briscoe et al. | 370/84 |
| 5,157,656 | 10/1992 | Turudic et al. | 370/84 |
| 5,164,940 | 11/1992 | Gray | 370/84 |
| 5,195,088 | 3/1993 | Urbansky | 370/84 |

FOREIGN PATENT DOCUMENTS 1514893 6/1978 United Kingdom .

*Primary Examiner*—Douglas W. Olms
*Assistant Examiner*—Chau T. Nguyen
*Attorney, Agent, or Firm*—Wolf, Greenfield & Sacks

[57] ABSTRACT

A common channel signal extraction/insertion device for a multiplexed digital transmission system includes a common channel signal insertion/extraction circuit instead of time switches. The common channel signal insertion/extraction circuit includes: a receiver-side speed converter memory 51A for buffering the multiplexed signal 13 received from the multiplexer circuit 3; and a transmitter-side speed converter memory 52A for buffering the common channel signals received from the common channel signal controller 7. The high-speed and the low-speed side reading and writing operations are controlled by the high-speed side controller 51C and the low-speed side controller 51D, respectively. The selector 53 selects between the common channel signals read out from the transmitter-side speed converter memory 52A and the data supplied from the digital switching channel 6, thereby obtaining the multiplexed signal 13a and outputting it to the demultiplexer 12.

18 Claims, 6 Drawing Sheets

FIG. 4

| | 51g | 51f | 51e |
|---|---|---|---|
| | LEAD.INFOR-MATION OF COMM. SIGNAL | SPEED INFORMATION OF COMM. SIGNAL | SIGNIFICANT INFORMATION OF COMM.SIGNAL |
| 0 | ⋮ | ⋮ | ⋮ |
| n | | | |
| | | | |

COMMON CHANNEL SIGNAL EXTRACTION/INSERTION DEVICE

BACKGROUND OF THE INVENTION

This invention relates to common channel signalling insertion/extraction devices using high-speed digital multiplexers.

FIG. 7 shows a conventional common channel signalling insertion/extraction device disclosed in Japanese Laid-Open Patent (Kokai) No. 60-153697. The digital signals 1 for a plurality of dedicated digital signal lines are terminated at digital terminals $DTI_1$–$DTI_n$ 2, each consisting of a modulator/demodulator, a frame synchronizer, a frame alignment and detection circuits for various alarm signals for the dedicated digital signal lines. The outputs from the digital terminals $DTI_1$–$DTI_n$ 2 are supplied to a multiplexer circuit 3 for multiplexing the digital signals 1. Thus, if there are four digital signal lines at 1.5 Mbps, a signal at more than 6 Mbps multiplexing the four digital signals are output from the multiplexer circuit 3.

The multiplexed signal from the multiplexer circuit 3 is supplied to the receiver side time switch 10a of the receiver/transmitter time switch 10, such that the data portions thereof are separated from the common channel signalling portions. The data and the common channel signals thus separated from each other are input to the digital switching channel 6 and the common channel signalling controller 7, respectively. The outputs of the digital switching channel 6 and the common channel signalling controller 7 are supplied to the transmitter side time switch 10b of receiver/transmitter time switch 10, where the data and the common channel signals are multiplexed. The multiplexed signal from the transmitter side time switch 10b is demultiplexed by the demultiplexer 12 and the resulting separate digital signals are output to the dedicated digital lines via the digital terminals $DTI_1$–$DTI_n$ 2.

The receiver side time switch 10a receives the multiplexed signal from the multiplexer circuit 3 and separates one or more common channel signals at 64 Kbps from data portions. Conversely, the transmitter side time switch 10b inserts one or more common channel signals at 64 Kbps at a plurality of predetermined positions of the multiplexed signal. The demultiplexer 12 demultiplexes and branches the signal to the dedicated digital lines via the digital terminals $DTI_1$–$DTI_n$ 2.

The common channel signalling controller 7 receives the common channel signalling at 64 Kbps from the receiver side time switch 10a and effects functions such as: the error correction of the data, the establishment of data link with the opposite communicating party, assembly of the data structure, and decoding of the signals within frames. The resulting output of the common channel signalling controller 7 is supplied to the switch controller 8, which is supplied with the data from the digital switching channel 6. The switch controller 8 supplies the data transmitted to the opposite communicating party to the common channel signalling controller 7. In response thereto, the common channel signalling controller 7 assembles the data transmitted to the opposite party, establishes the data link therewith, and outputs the common channel signalling at 64 Kbps to the transmitter side time switch 10b.

The above conventional common channel signalling insertion/extraction device has the following disadvantage. When the capacity of the device is enlarged (for example, when high-speed dedicated digital lines are accommodated or when the multiplexed number of dedicated digital lines are increased), the data transmission rate from the multiplexer circuit 3 to the receiver/transmitter time switch 10 and from the receiver/transmitter time switch 10 to the demultiplexer 12 increases. Thus, the processing speed of the receiver/transmitter time switch 10 should also be increased. Within the receiver side time switch 10a, however, the data and the common channel signals are processed by the same circuit. Thus the reading-out and the writing-out rates of the common channel signals increase accordingly. A common channel signalling controller 7 which can respond to the high-speed input/output becomes necessary.

If such a common channel signalling controller 7 is implemented with the ICs and LSIs that are commercially available, the device becomes expensive, or the number of supported channels must be reduced. Further, since the common channel signals and the data are processed by the same circuit of the receiver/transmitter time switch 10, the failure of the receiver/transmitter time switch 10 directly affects the processing of the common channel signals.

SUMMARY OF THE INVENTION

It is therefore an object of this invention to provide a common channel signalling insertion/extraction device by which the common channel signals are processed at a speed (processing rate) independent of the input/output rate of the multiplexed signal and by which the time switches can be dispensed with.

The above object is accomplished in accordance with the principle of this invention by a common channel signalling insertion/extraction device for extracting and inserting common channel signals contained in a multiplexed signal transmitted across a multiplexed digital signal transmission system which includes: a plurality of digital terminals each for terminating a dedicated digital line for transmitting a digital signal containing at least one common channel signalling; multiplexer means for multiplexing digital signals received at the digital terminals, the multiplexer means outputting a multiplexed signal containing common channel signals at predetermined bit positions within each frame thereof; channel means coupled to the multiplexer means, for transmitting therethrough the multiplexed signal output from the multiplexer means; common channel signalling controller means for processing the common channel signals contained in the multiplexed signal; and demultiplexer means for demultiplexing the multiplexed signal transmitted over the channel means and for outputting demultiplexed signals to the plurality of digital terminals to transmit the demultiplexed signals to respective dedicated digital lines; the common channel signalling insertion/extraction device which comprises common channel signalling extraction circuit means coupled to the multiplexer means, for extracting the common channel signals from the multiplexed signal and for supplying the common channel signals to the common channel signalling controller means at a bit rate equal to an input bit rate of the common channel signalling controller means; common channel signalling insertion circuit means coupled to the channel means and the common channel signalling controller means, for receiving the common channel signals from the common channel signalling controller means at an output bit rate of the common channel signalling controller means and for inserting the common channel signals at predetermined bit positions in each frame of the multiplexed signal received from the channel means, the common channel signalling insertion circuit means outputting the multiplexed signal containing the common channel signals to the demultiplexer means.

Preferably, the common channel signalling extraction circuit means and common channel signalling insertion circuit means include: receiver-side buffer means coupled to the multiplexer means, for buffering the common channel signals; transmitter-side buffer means coupled to the common channel signalling controller means, for buffering the common channel signals; high-speed side controller means for write enabling the receiver-side buffer means and read enabling the transmitter-side buffer means at time points corresponding to predetermined bit positions corresponding to the common channel signals, such that the common channel signals supplied from the multiplexer means are stored in the receiver-side buffer and the common channel signals stored in the transmitter-side buffer means are read out therefrom at time points corresponding to predetermined bit positions corresponding to the common channel signals; and low-speed side controller for read enabling the receiver-side and write enabling the transmitter-side buffer means in synchronism with input/output operations of the common channel signalling controller means, such that the common channel signals stored in the receiver-side are read out therefrom to the common channel signalling controller means and the common channel signals output from the common channel signal controller means are stored in the transmitter-side buffer means in synchronism with input/output operations of the common channel signalling controller means; wherein the common channel signalling extraction circuit means includes: the receiver-side buffer means and the high-speed side and low-speed side controllers, and the common channel signalling insertion circuit means includes: the transmitter-side buffer means and the high-speed side and low-speed side controllers.

Still preferably, the common channel signalling insertion circuit means further includes a selector means coupled to the transmitter-side buffer means and the channel means, for selecting between the common channel signals read out from the transmitter-side buffer means and data contained in the multiplexed signal supplied from the channel means.

Still preferably, the high-speed side controller means includes setting memory means for storing first items of information indicating respective bit positions of the common channel signals within the frame of the multiplexed signal and second items of information indicating respective leading positions of the common channel signals for respective routes of the digital signals received at and transmitted from the digital terminals; the high-speed side controller means determines bit positions of common channel signals within the frame of the multiplexed signal on the basis of the first items of information; the high-speed side controller means write enables the receiver-side buffer means at addresses corresponding to respective common channel signals at time points corresponding to the bit positions, such that the common channel signals and the second items of information corresponding thereto are stored in the receiver-side buffer means at the respective addresses; the high-speed side controller means read enables the transmitter-side buffer means at addresses corresponding to respective common channel signals at time points corresponding to the bit positions, such that the common channel signals stored in the transmitter-side buffer means at the respective addresses are read out therefrom at time points corresponding to the bit positions; and the low-speed side controller reads out the second items of information corresponding to respective common channel signals, the low-speed side controller determining routes for respective common channel signals on the basis of the second items of information, and outputting enabling signals corresponding to the routes to the common channel signalling controller means.

The second items of information may include leading position information indicating leading positions of the common channel signals for respective routes, the low-speed side controller means updating the enabling signals in response to each change in the leading position information. Alternatively, the second items of information may include route information indicating routes for respective common channel signals, the low-speed side controller means decoding the route information and generating the enabling signals in accordance therewith. The first items of information may includes: significant received information of the common channel signalling and speed (transmission rate) information of the common channel signalling.

BRIEF DESCRIPTION OF THE DRAWINGS

The features which are believed to be characteristic of this invention are set forth with particularity in the appended claims. The structure and method of operation of this invention itself, however, will be best understood from the following detailed description, taken in conjunction with the accompanying drawings, in which:

FIG. 4 is a table showing the information stored in the setting memory of the common channel signalling insertion/extraction circuit in FIG. 3;

In the drawings, like reference numerals represent like or corresponding parts or portions.

DETAILED DESCRIPTION OF THE PREFERRED EMBODIMENTS

Referring now to the accompanying drawings, the preferred embodiments of this invention are described.

Figure 1:
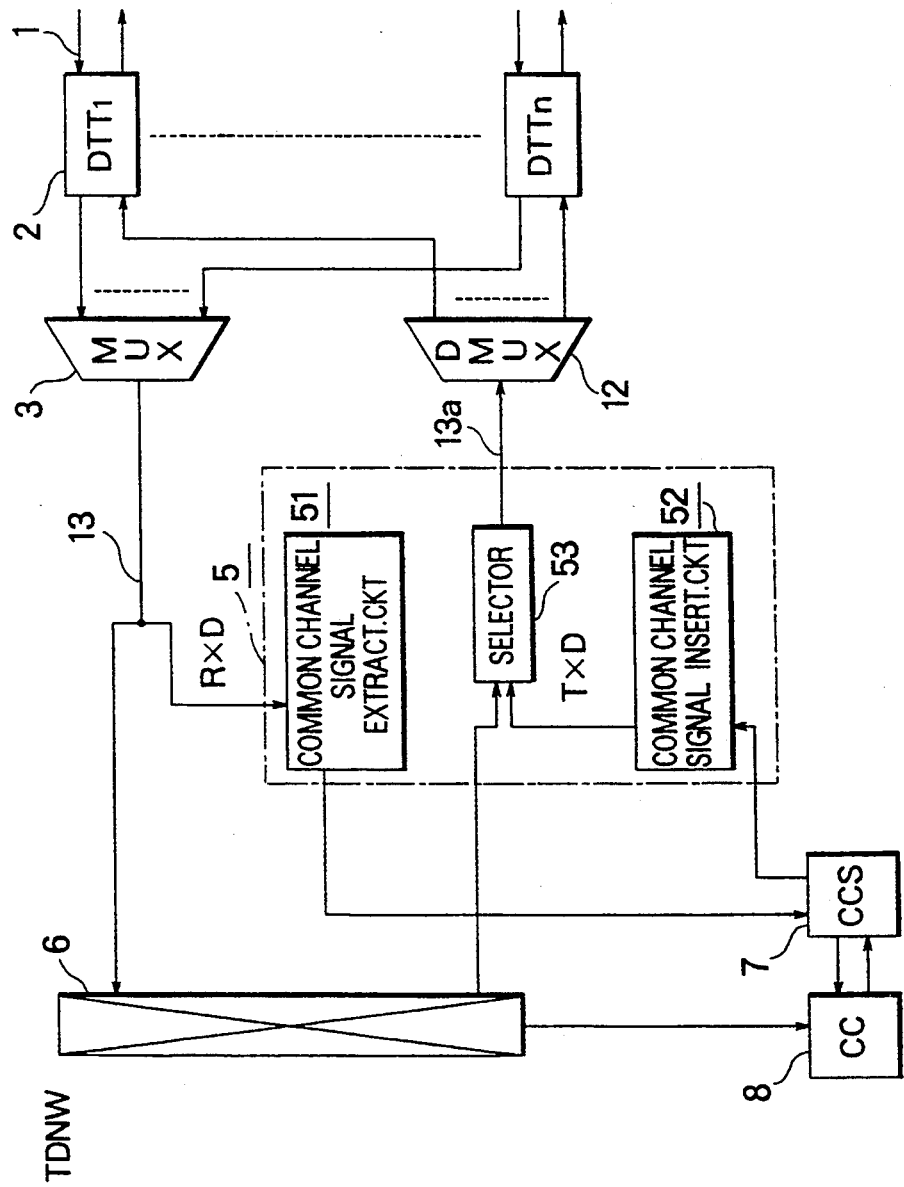
FIG. 1 is a block diagram showing the structure of a common channel signalling insertion/extraction device according to this invention.
Figure 7:
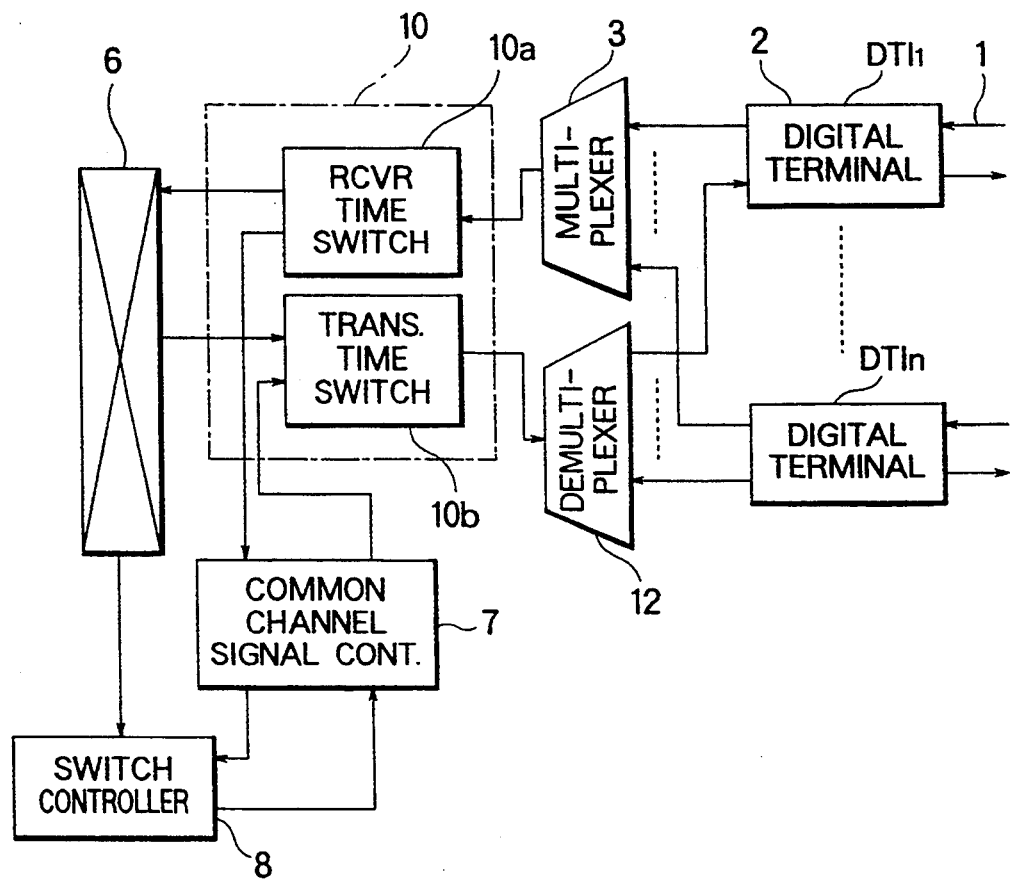
FIG. 7 is a block diagram showing the structure of a conventional common channel signalling insertion/extraction device.

FIG. 1 is a block diagram showing the structure of a common channel signalling insertion/extraction device according to this invention. The parts similar to those of FIG. 7 are designated by the same reference numerals. Instead of the receiver/transmitter time switch 10 of FIG. 7, the circuit of FIG. 1 is provided with a common channel signalling insertion/extraction circuit 5 including: common channel signalling extraction circuit 51 for extracting the common channel signals from the multiplexed signal received from the multiplexer circuit 3 and for converting the speed or the transmission rate thereof; a common channel signalling insertion circuit 52 for converting the speed or the transmission rate of the common channel signals received from the common channel signalling controller 7 and for inserting them in the multiplexed signal; and a selector 53 for selecting between the data and the common channel signalling. The digital signals 1 upon the dedicated digital lines are terminated at the digital terminals $DTI_1$–$DTI_n$ 2 and thence are connected to the multiplexer circuit 3. The operations of the digital terminals $DTI_1$–$DTI_n$ 2 and the multiplexer circuit 3 are the same as those of FIG. 7.

Figure 2:
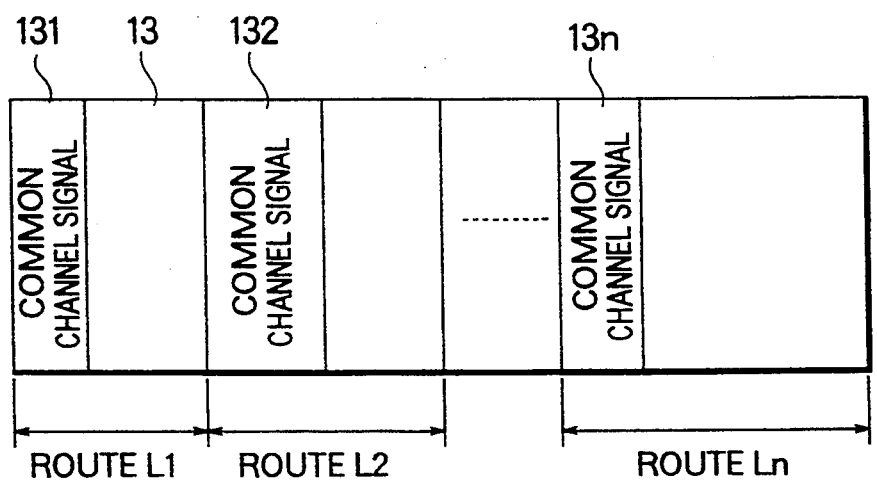
FIG. 2 is a diagram showing the frame format of the multiplexed signal in FIG. 1.

FIG. 2 is a diagram showing the frame format of the multiplexed signal in FIG. 1. The multiplexed signal 13 output from the multiplexer circuit 3 by a unit of 64K (i.e., in 64K×n) includes the multiplexed common channel signals $13_1$, $13_2$, - - -, $13_n$ received from the plurality of routes $L_1$, $L_2$, - - -, $L_n$-. The common channel signals for the respective routes may exhibit the same or different transmission rates. For example, the common channel signalling $13_1$ for the route $L_1$ is at 16K, the common channel signalling $13_2$ for the route $L_2$ is at 256K, and the common channel signalling $13_n$ for the route $L_n$ is at 64K.

The output of the multiplexer circuit 3 is branched to the digital switching channel 6 and the common channel signalling extraction circuit 51. The common channel signalling extraction circuit 51 extracts one or more common channel signals at the predetermined positions of the multiplexed signal 13 and converts the speed (transmission rate) thereof to the input rate (speed) of the common channel signalling controller 7. The data from the digital switching channel 6 is supplied to the selector 53 and the switch controller 8. The common channel signals from the common channel signalling controller 7 are supplied to the common channel signalling insertion circuit 52 at the output rate (speed) of the common channel signalling controller 7. The common channel signalling insertion circuit 52 converts the rate of the common channel signals to the multiplexed rate of the multiplexed signal 13, and outputs them to the selector 53 at the predetermined positions thereof. The selector 53 multiplexes the data received from the digital switching channel 6 and the common channel signals received from the common channel signalling insertion circuit 52, thereby obtaining the multiplexed signal 13a. The multiplexed signal 13a is demultiplexed by the demultiplexer 12 for respective lines and is thence transmitted to the dedicated digital lines via the digital terminals $DTI_1$–$DTI_n$ 2.

Thus, the transmitter and receiver side time switches disposed at the stages preceding and following the digital switching channel 6 can be dispensed with. Further, the insertion and extraction of the common channel signals can be effected irrespective of the increase in multiplexed data capacity. The circuit is thus substantially simplified.

Figure 3:
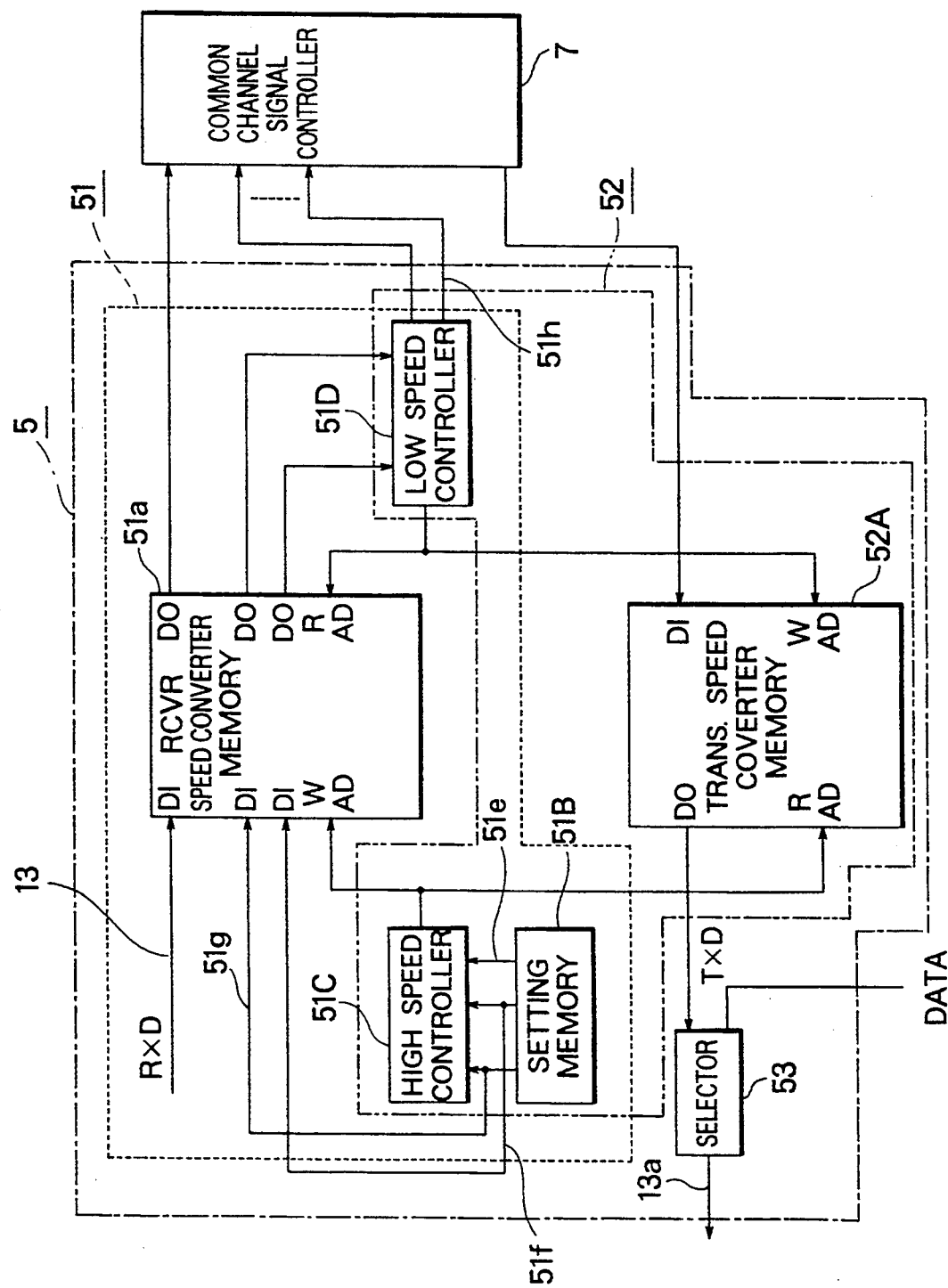
FIG. 3 shows the details of an embodiment of the common channel signalling insertion/extraction circuit of FIG. 1.

FIG. 3 shows the details of an embodiment of the common channel signalling insertion/extraction circuit of FIG. 1. The common channel signalling extraction circuit 51 is implemented by: a receiver-side speed converter memory 51A, a setting memory 51B, a high-speed side controller 51C, and a low-speed side controller 51D. On the other hand, the common channel signalling insertion circuit 52 is implemented by: the transmitter-side speed converter memory 52A, the setting memory 51B, the high-speed side controller 51C, the low-speed side controller 51D. The setting memory 51B, the high-speed side controller 51C, and the low-speed side controller 51D are shared by the common channel signalling extraction circuit 51 and the common channel signalling insertion circuit 52.

In summary, the operation of the circuit of FIG. 3 is as follows. The common channel signals are extracted from the multiplexed signal 13 from the multiplexer circuit 3 of FIG. 1 (received signal RxD) and are buffered in the receiver-side speed converter memory 51A. The extraction is effected by the high-speed side controller 51C based on the information stored in the setting memory 51B. The common channel signals buffered in the receiver-side speed converter memory 51A are supplied therefrom to the common channel signalling controller 7 at the input rate of the common channel signalling controller 7. The common channel signals supplied from the common channel signalling controller 7 at the output rate thereof is buffered in the transmitter-side speed converter memory 52A by means of the low-speed side controller 51D. The common channel signals buffered in the transmitter-side speed converter memory 52A are read out therefrom to the selector 53 at the rate of the multiplexed signal 13a. This operation is controlled by the high-speed side controller 51C. Thus, the multiplexed signal 13 from the multiplexer circuit 3 is first input to the receiver-side speed converter memory 51A. As described above the received signal Rxd is a multiplexed signal in which the common channel signals and data for a plurality of routes are multiplexed. The attributes of the common channel signals for the respective routes are stored in the setting memory 51B. FIG. 4 is a table showing the information stored in the setting memory of the common channel signalling insertion/extraction circuit in FIG. 3. At the addresses corresponding to the respective time slots 1 through $v$ for the multiplexed lines (shown at the left of the table in FIG. 4) are stored in the setting memory 51B (from right to left in FIG. 4): the significant received information of the common channel signal 51e, the speed (transmission rate) information of the common channel signalling 51f, and the leading part information of the common channel signalling 51g for indicating the leading position or part of the common channel signals for the respective routes.

The significant received information of the common channel signalling 51e, the speed information 51f and the leading information 51g thereof are read out sequentially from the setting memory 51B to the high-speed side controller 51C, from the top to the bottom of the time slots 1 through $v$. On the basis thereof, the high-speed side controller 51C determines the respective bit positions of the common channel signals within the received signal RxD. At each bit position thus determined, the high-speed side controller 51C outputs the address corresponding to the bit position and the address enable signal to the receiver-side speed converter memory 51A. In response thereto, the leading part information of the common channel signalling 51g and the speed (transmission rate) information of the common channel signalling 51f stored in the setting memory 51B at the corresponding address are written into the receiver-side speed converter memory 51A, together with the common channel signals occurring at the corresponding bit position. Thus, the common channel signals are stored in order in the receiver-side speed converter memory 51A at the respective addresses.

The common channel signals buffered in the receiver-side speed converter memory 51A is read out therefrom at the predetermined input/output speed (rate) of the common channel signalling controller 7. Namely, the low-speed side controller 51D supplies to the receiver-side speed converter memory 51A the addresses from the top to the bottom (and the write enable signal), at the input/output rate of the common channel signalling controller 7. In response thereto, the common channel signalling, the leading part information of the common channel signalling 51g and the speed (transmission rate) information of the common channel signalling 51f corresponding to each address are read out from the receiver-side speed converter memory 51A, thereby effecting the speed conversion of the respective signals. The common channel signals are supplied from the receiver-side speed converter memory 51A to the common channel signalling controller 7 while the leading part information of the common channel signalling and the speed (transmission rate) information of the common channel signalling are supplied to the low-speed side controller 51D.

On the basis of the speed (transmission rate) information of the common channel signalling 51f and the change in the leading part information of the common channel signalling 51g, the low-speed side controller 51D determines the route corresponding to the common channel signalling. At each change in the leading part information of the common channel signalling 51g, the low-speed side controller 51D generates the enable signal 51h for the respective route thus determined and outputs it to the common channel signalling controller 7. Thus, the common channel signals read out from the receiver-side speed converter memory 51A and the enable signal 51h indicating the route corresponding thereto are supplied to the common channel signalling controller 7.

The common channel signals for the respective routes are supplied from the common channel signalling controller 7 in synchronism with (the periods of) the enable signal 51h to the transmitter-side speed converter memory 52A and are stored therein at the write addresses supplied from the low-speed side controller 51D. The address supplied from the low-speed side controller 51D is the same as that of the corresponding common channel signalling read out from the receiver-side speed converter memory 51A to the common channel signalling controller 7. The common channel signals from the common channel signalling controller 7 are buffered in the transmitter-side speed converter memory 52A at the respective addresses.

The common channel signals stored in the transmitter-side speed converter memory 52A are read out therefrom by means of the signals supplied from the high-speed side controller 51C. Namely, the high-speed side controller 51C supplies the addresses to the transmitter-side speed converter memory 52A at the high-speed multiplexed signal rate. The read-out addresses are the same as the addresses at which the common channel signals of the corresponding routes of the received signal RxD are written in the receiver-side speed converter memory 51A. Thus in synchronism with the address signal and the address enable signal supplied from the high-speed side controller 51C, the common channel signals TxD for the respective routes stored in the transmitter-side speed converter memory 52A at the corresponding addresses are read out therefrom at the high-speed rate to the selector 53. Upon receiving the common channel signals from the transmitter-side speed converter memory 52A and the data from the digital switching channel 6, the selector 53 generates the multiplexed signal 13a.

Figure 5:
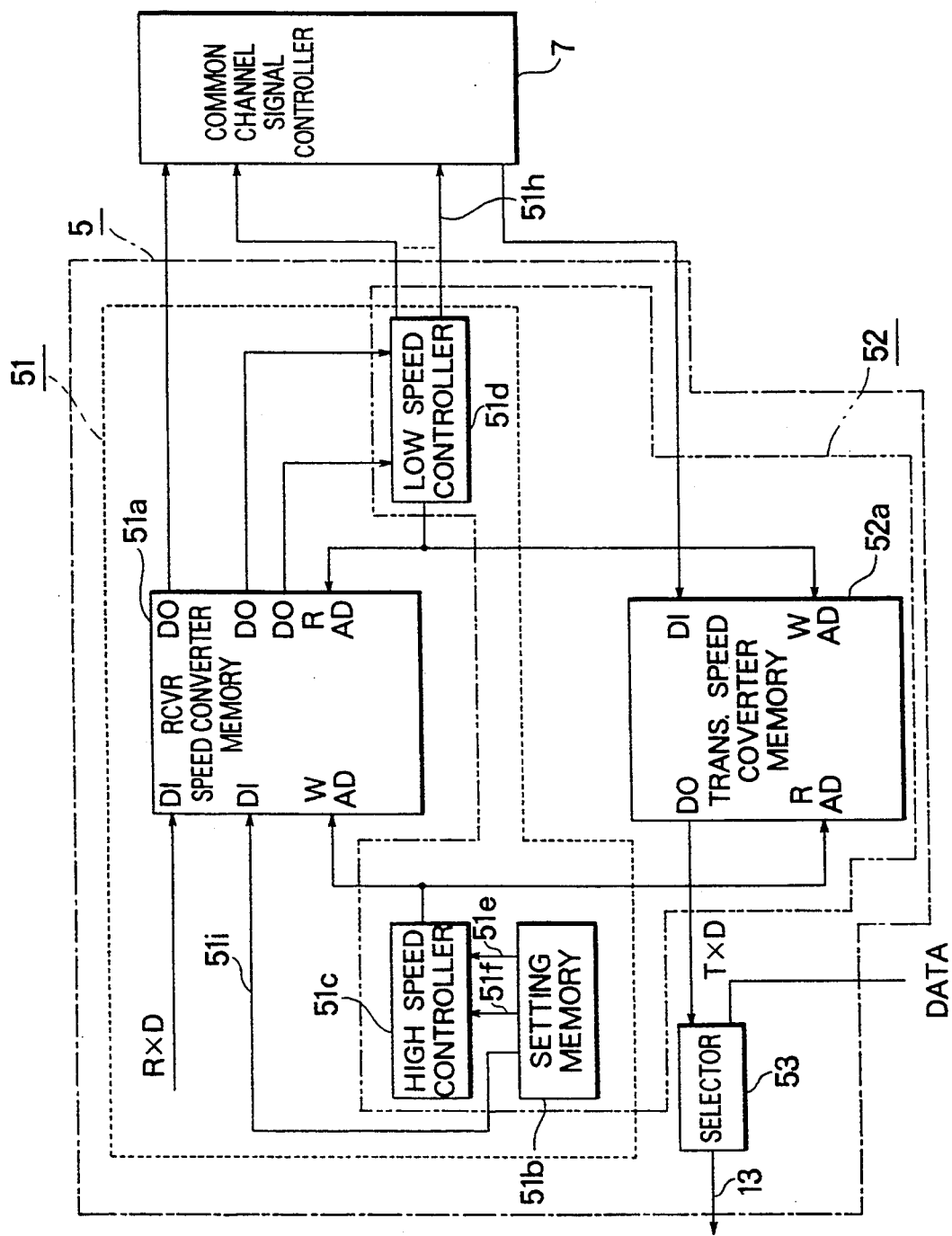
FIG. 5 is a block diagram showing another embodiment of the structure of common channel signalling insertion/extraction circuit of FIG. 1.
Figure 6:
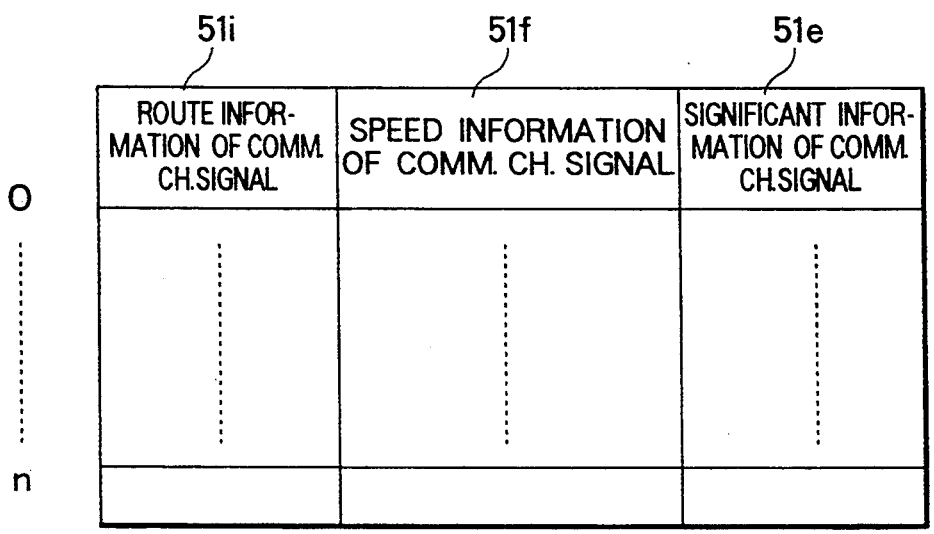
FIG. 6 is a table showing the information stored in the setting memory of the common channel signalling insertion/extraction circuit in FIG. 5.

FIG. 5 is a block diagram showing another embodiment of the structure of common channel signalling insertion/extraction circuit of FIG. 1, where the parts 51a through 51d and 52a corresponds to the parts 51A through 51D and 52A of FIG. 3, respectively. FIG. 6 is a table showing the information stored in the setting memory of the common channel signalling insertion/extraction circuit in FIG. 5. At the addresses corresponding to the respective time slots 1 through $v$ for the respective multiplexed lines in the setting memory 51b (shown at the left of the table in FIG. 6) are stored the respective attributes of the common channel signals: the significant received information of the common channel signalling 51e, the speed (transmission rate) information of the common channel signalling 51f, and the route information of the common channel signalling 51i (from right to left in FIG. 6).

The distinction of the circuit of FIG. 5 over the circuit of FIG. 3 lies in the information stored in the setting memory 51b. In the case of the circuit of FIG. 3, the leading part information of the common channel signalling 51g of the respective common channel signals is used for identifying the respective routes. Thus, it is judged at the low-speed side that, each time a variation of the leading information is detected, the common channel signalling for a distinct route begins. Consequently, the enable signal 51h for the respective routes supplied to the common channel signalling controller 7 is switched in response to each change in the leading information. In the case of the circuit of FIG. 5, on the other hand, the route information 51i directly indicating the routes of the common channel signals is stored in the setting memory 51b. Thus, the route information is simply decoded at the low-speed side to generate the respective enable signal 51h of the common channel signals supplied to the common channel signalling controller 7. Even if new routes are added or old ones removed, the route information of the common channel signalling 51i for the unmodified routes may be kept without change in the setting memory 51b. The enable signal 51h for such routes can be generated in response to the route information without modification.

Next, the operation of the circuit of FIG. 5 is described in detail. The multiplexed signal 13 from the multiplexer circuit 3 of FIG. 1 (received signal RxD) is input to the receiver-side speed converter memory 51a. As described above the received signal Rxd is a multiplexed signal in which the common channel signals and data for a plurality of routes are multiplexed. The attributes of the common channel signals for the respective routes are stored in the setting memory 51b as shown in FIG. 6. At the addresses corresponding to the respective time slots 1 through $v$ for the multiplexed lines (shown at the left of the table in FIG. 6) are stored in the setting memory 51b (from right to left in FIG. 6): the significant received information of the common channel signalling 51e, the speed (transmission rate) information of the common channel signalling 51f, and the route information of the common channel signalling 51i indicating the routes of the common channel signals. The significant received information of the common channel signalling 51e, the speed information 51f, and the leading information 51i are read out sequentially from the setting memory 51b, from the top to the bottom of the time slots 1 through n, and are input to the high-speed side controller 51c. The high-speed side controller 51c determines the bit positions of the common channel signals within the received signal RxD, and outputs at the determined bit positions the address signal and the address enable signal to the receiver-side speed converter memory 51a, such that the route information of the common channel signalling 51i and the speed (transmission rate) information of the common channel signalling 51f stored in the setting memory 51b are written into the receiver-side speed converter memory 51a together with the common channel signals occurring at the corresponding positions.

On the other hand, the low-speed side controller 51d, operating at the predetermined input/output speed (rate) of the common channel signalling controller 7, outputs to the receiver-side speed converter memory 51a the addresses from the top to the bottom. In response thereto, from the receiver-side speed converter memory 51a are read out the common channel signals, the route information of the common channel signalling and the speed (transmission rate) information of the common channel signalling. The speed conversion of the respective signals is thus effected. The common channel signals are supplied from the receiver-side speed converter memory 51a to the common channel signalling controller 7 and the route information of the common channel signalling and the speed (transmission rate) information of the common channel signalling are supplied to the low-speed side controller 51d. Decoding the route information, the low-speed side controller 51d generates the enable signal 51h for the respective routes, such that the enable signal 51h and the common channel signals read out from the receiver-side speed converter memory 51a are supplied to the common channel signalling controller 7.

The common channel signals for the respective routes are supplied from the common channel signalling controller 7 in synchronism with the periods of the enable signal 51h to the transmitter-side speed converter memory 52a and are stored therein in accordance with the write addresses supplied from the low-speed side controller 51d. The addresses supplied from the low-speed side controller 51d are the same as those of the corresponding common channel signals read out from the receiver-side speed converter memory 51a to the common channel signalling controller 7. On the other hand, the addresses at the high-speed side at which the common channel signals are read out from the transmitter-side speed converter memory 52a are supplied from the high-speed side controller 51c. The read-out addresses are the same as the addresses at which the common channel signals of the corresponding routes of the received signal RxD are written in the receiver-side speed converter memory 51a.

What is claimed is:

1. A common channel signalling insertion/extraction device for extracting common channel signals from incoming digital signals received from a digital signal transmission system, and for inserting common channel signals into outgoing digital signals to be transmitted to said digital signal transmission system, said common channel signalling insertion/extraction device comprising:

a plurality of digital terminals, each terminal including means for terminating a dedicated digital line, each dedicated digital line transmitting an incoming digital signal containing at least one incoming common channel signal and an outgoing digital signal containing at least one outgoing common channel signal;

multiplexer means for multiplexing said incoming digital signals received via said digital terminals, said multiplexer means including means for outputting at a high-speed transmission rate a first multiplexed signal having incoming common channel signals in a series of frames, each frame containing a significant incoming information signal and an associated incoming common channel signal at a predetermined bit position within said frame, said incoming common channel signal defining a digital signal transmission rate;

channel means coupled to said multiplexer means, for transmitting there through said first multiplexed signal;

common channel signalling extraction circuit means, coupled to said multiplexer means via said channel means, for extracting said incoming common channel signals from said first multiplexed signal at said high-speed transmission rate and for outputting said incoming common channel signals at a low-speed transmission rate that is less than said high-speed transmission rate;

common channel signalling controller means for receiving said incoming common channel signals at said low-speed transmission rate from said common channel signalling extraction circuit means, producing outgoing common channel signals, and outputting said outgoing common channel signals at said low-speed transmission rate;

common channel signalling insertion circuit means, coupled to said channel means via said common channel signalling controller means, for receiving said outgoing common channel signals from said common channel signalling controller means at said low-speed transmission rate, for inserting, at said high-speed transmission rate, each of said outgoing common channel signals at a predetermined bit position in each frame of a first multiplexed signal received from said channel means via said common channel signalling controller means to produce a second multiplexed signal containing said outgoing common channel signals; and demultiplexer means for demultiplexing said second multiplexed signal to produce outgoing digital signals, and for outputting said outgoing digital signals via said plurality of digital terminals to dedicated digital lines, wherein said common channel signalling extraction circuit means and common channel signalling insertion circuit means include:

receiver-side buffer means, coupled to receive incoming common channel signals from said multiplexer means via said channel means, for buffering said incoming common channel signals;

transmitter-side buffer means, coupled to receive outgoing common channel signals from said common channel signalling controller means, for buffering said outgoing common channel signals;

high-speed side controller means, coupled to said receiver-side buffer means and to said transmitter-side buffer means, for write enabling said receiver-side buffer means and read enabling said transmitter-side buffer means at time points corresponding to predetermined bit positions of said incoming common channel signals and said outgoing common channel signals respectively, such that said incoming common channel signals supplied from said multiplexer means via said receiver-side buffer means are stored in said receiver-side buffer and said outgoing common channel signals stored in said transmitter-side buffer means are read out therefrom at time points corresponding to predetermined bit positions of said outgoing common channel signals; and low-speed side controller means, coupled to said receiver-side buffer means and to said transmitter-side buffer means, for read enabling said receiver-side buffer means and write enabling said transmitter-side buffer means in synchronism with input/output operations of said common channel signalling controller means, such that said incoming common channel signals stored in said receiver-side buffer means are read out therefrom to said common channel signalling controller means and said outgoing common channel signals output from said common channel signalling controller means are stored in said transmitter-side buffer means in synchronism with input/output operations of said common channel signalling controller means;

wherein said common channel signalling extraction circuit means includes said receiver-side buffer means;

wherein said common channel signalling insertion circuit means includes said transmitter-side buffer means; and wherein said common channel signalling extraction circuit means and said common channel signalling insertion circuit means share said high-speed side controller and said low-speed side controller.

2. A common channel signalling insertion/extraction device as claimed in claim 1, further including selector means, coupled to said transmitter-side buffer means and said channel means, for multiplexing said outgoing common channel signals from said transmitter-side buffer means and said significant information signals contained in said first multiplexed signal from said channel means.

3. A common channel signalling insertion/extraction device as claimed in claim 1, wherein:

said high-speed side controller means includes setting memory means for storing first items of information indicating respective bit positions of said incoming common channel signals within frames of said first multiplexed signal and second items of information indicating respective leading positions of said incoming common channel signals for respective routes of said significant information signals;

said high-speed side controller means includes means for determining bit positions of incoming common channel signals within a frame of said first multiplexed signal according to said first items of information;

said high-speed side controller means includes means for write enabling said receiver-side buffer means at addresses corresponding to respective incoming common channel signals at time points corresponding to said bit positions, such that said incoming common channel signals and said second items of information corresponding thereto are stored in said receiver-side buffer means at said respective addresses;

said high-speed side controller means includes means for read enabling said transmitter-side buffer means at addresses corresponding to respective outgoing common channel signals at time points corresponding to said bit positions, such that said outgoing common channel signals stored in said transmitter-side buffer means at said respective addresses are read out therefrom at time points corresponding to said bit positions; and said low-speed side controller includes means for reading said second items of information corresponding to respective outgoing common channel signals, for determining routes for respective outgoing common channel signals according to said second items of information, and for outputting enabling signals corresponding to said routes to said common channel signalling controller means.

4. A common channel signalling insertion/extraction device as claimed in claim 3, wherein each of said second items of information includes a leading position information indicating a leading position in an incoming common channel signal for a corresponding route, said low-speed side controller means having means for updating said enabling signal in response to each change in said leading position information.

5. A common channel signalling insertion/extraction device as claimed in claim 3, wherein said second items of information include route information indicating routes for respective incoming common channel signals, said low-speed side controller means includes means for decoding said route information to produce decoded route information, and means for generating said enabling signals in accordance with said decoded route information.

6. A common channel signalling insertion/extraction device as claimed in claim 3, wherein an item of said first items of information includes significant information and a digital signal transmission rate.

7. A common channel signalling insertion/extraction device for extracting common channel signals from incoming digital signals received from a digital signal transmission system, and for inserting common channel signals into outgoing digital signals to be transmitted to said digital signal transmission system, said common channel signalling insertion/extraction device comprising:

a plurality of digital terminals, each terminal including means for terminating a dedicated digital line, each dedicated digital line transmitting an incoming digital signal containing at least one incoming common channel signal and an outgoing digital signal containing at least one outgoing common channel signal;

multiplexer means for multiplexing said incoming digital signals received via said digital terminals, said multiplexer means including means for outputting at a high-speed transmission rate a first multiplexed signal having incoming common channel signals in a series of frames, each frame containing a significant incoming information signal and an associated incoming common channel signal at a predetermined bit position within said frame, said incoming common channel signal defining a digital signal transmission rate;

channel means coupled to said multiplexer means, for transmitting there through said first multiplexed signal;

common channel signalling extraction circuit means, coupled to said multiplexer means via said channel means, for extracting said incoming common channel signals from said first multiplexed signal at said high-speed transmission rate and for outputting said incoming common channel signals at a low-speed transmission rate that is less than said high-speed transmission rate;

common channel signalling controller means for receiving said incoming common channel signals at said low-speed transmission rate from said common channel signalling extraction circuit means, producing outgoing common channel signals, and outputting said outgoing common channel signals at said low-speed transmission rate;

common channel signalling insertion circuit means, coupled to said channel means via said common channel signalling controller means, for receiving said outgoing common channel signals from said common channel signalling controller means at said low-speed transmission rate, for inserting, at said high-speed transmission rate, each of said outgoing common channel signals at a predetermined bit position in each frame of a first multiplexed signal received from said channel means via said common channel signalling controller means to produce a second multiplexed signal containing said outgoing common channel signals; and demultiplexer means for demultiplexing said second multiplexed signal to produce outgoing digital signals, and for outputting said outgoing digital signals via said plurality of digital terminals to dedicated digital lines, further comprising:

receiver-side buffer means, coupled to receive incoming common channel signals from said multiplexer means, for buffering said incoming common channel signals;

transmitter-side buffer means, coupled to receive outgoing common channel signals from said common channel signalling controller means, for buffering said outgoing common channel signals;

high-speed side controller means, coupled to said receiver-side buffer means and to said transmitter-side buffer means, for write enabling said receiver-side buffer means and read enabling said transmitter-side buffer means at time points corresponding to predetermined bit positions of said incoming common channel signals and said outgoing signals respectively, such that said incoming common channel signals supplied from said multiplexer means via said receiver-side buffer means are stored in said receiver-side buffer and said outgoing common channel signals stored in said transmitter-side buffer means are read out therefrom at time points corresponding to predetermined bit positions of said common channel signals;

low-speed side controller means, coupled to said receiver-side buffer means and to said transmitter-side buffer means, for read enabling said receiver-side buffer means and write enabling said transmitter-side buffer means in synchronism with input/output operations of said common channel signalling controller means, such that said common channel signals stored in said receiver-side buffer means are read out therefrom to said common channel signalling controller means and said common channel signals output from said common channel signalling controller means are stored in said transmitter-side buffer means in synchronism with input/output operations of said common channel signalling controller means; and selector means, having inputs coupled to said transmitter-side buffer means and said channel means and an output coupled to said demultiplexer means, for multiplexing outgoing common channel signals from said transmitter-side buffer means and significant information signals from said channel means and outputting a second multiplexed signal to said demultiplexer means.

8. A common channel signalling insertion/extraction device for extracting common channel signals from incoming digital signals received from a digital signal transmission system, and for inserting common channel signals into outgoing digital signals to be transmitted to said digital signal transmission system, said common channel signalling insertion/extraction device comprising:

a plurality of digital terminals, each terminal including means for terminating a dedicated digital line, each dedicated digital line transmitting an incoming digital signal containing at least one incoming common channel signal and an outgoing digital signal containing at least one outgoing common channel signal;

multiplexer means for multiplexing said incoming digital signals received via said digital terminals, said multiplexer means including means for outputting at a high-speed transmission rate a first multiplexed signal having incoming common channel signals in a series of frames, each frame containing a significant incoming information signal and an associated incoming common channel signal at a predetermined bit position within said frame, said incoming common channel signal defining a digital signal transmission rate;

channel means coupled to said multiplexer means, for transmitting there through said first multiplexed signal;

common channel signalling extraction circuit means, coupled to said multiplexer means via said channel means, for extracting said incoming common channel signals from said first multiplexed signal at said high-speed transmission rate and for outputting said incoming common channel signals at a low-speed transmission rate that is less than said high-speed transmission rate;

common channel signalling controller means for receiving said incoming common channel signals at said low-speed transmission rate from said common channel signalling extraction circuit means, producing outgoing common channel signals, and outputting said outgoing common channel signals at said low-speed transmission rate;

common channel signalling insertion circuit means, coupled to said channel means via said common channel signalling controller means, for receiving said outgoing common channel signals from said common channel signalling controller means at said low-speed transmission rate, for inserting, at said high-speed transmission rate, each of said outgoing common channel signals at a predetermined bit position in each frame of a first multiplexed signal received from said channel means via said common channel signalling controller means to produce a second multiplexed signal containing said outgoing common channel signals; and demultiplexer means for demultiplexing said second multiplexed signal to produce outgoing digital signals, and for outputting said outgoing digital signals via said plurality of digital terminals to dedicated digital lines, further comprising: receiver-side buffer means, coupled to receive incoming common channel signals from said multiplexer means, for buffering said incoming common channel signals;

transmitter-side buffer means, coupled to receive outgoing common channel signals from said common channel signalling controller means, for buffering said outgoing common channel signals;

high-speed side controller means, coupled to said receiver-side buffer means and to said transmitter-side buffer means, for write enabling said receiver-side buffer means and read enabling said transmitter-side buffer means at time points corresponding to predetermined bit positions of said incoming common channel signals and said outgoing common channel signals respectively, such that said incoming common channel signals supplied from said multiplexer means via said receiver-side buffer means are stored in said receiver-side buffer means and said outgoing common channel signals stored in said transmitter-side buffer means are read out therefrom at time points corresponding to predetermined bit positions of said common channel signals;

low-speed side controller means, coupled to said receiver-side buffer means and to said transmitter-side buffer means, for read enabling said receiver-side buffer means and write enabling said transmitter-side buffer means in synchronism with input/output operations of said common channel signalling controller means, such that said common channel signals stored in said receiver-side buffer means are read out therefrom to said common channel signalling controller means and said common channel signals output from said common channel signalling controller means are stored in said transmitter-side buffer means in synchronism with input/output operations of said common channel signalling controller means;

setting memory means for storing first items of information indicating respective bit positions of said incoming common channel signals within said frame of said multiplexed signal and second items of information indicating respective leading positions of said common channel signals for respective routes of said significant information signals received at and transmitted from said digital terminals;

means for determining bit positions of incoming common channel signals within a frame of said multiplexed signal according to said first items of information;

means for write enabling said receiver-side buffer means at addresses corresponding to respective incoming common channel signals at time points corresponding to said bit positions, such that said common channel signals and said second items of information corresponding thereto are stored in said receiver-side buffer means at said respective addresses;

means for read enabling said transmitter-side buffer means at addresses corresponding to respective incoming common channel signals at time points corresponding to said bit positions, such that said common channel signals stored in said transmitter-side buffer means at said respective addresses are read out therefrom at time points corresponding to said bit positions; and means for reading said second items of information corresponding to respective incoming common channel signals, for determining routes for respective incoming common channel signals according to said second items of information, and for outputting enabling signals corresponding to said routes to said common channel signalling controller means.

9. A common channel signalling insertion/extraction device as claimed in claim 8, wherein each of said second items of information includes a leading position information indicating a leading position in an incoming common channel signal for a corresponding route, said low-speed side controller means having means for updating said enabling signal in response to each change in said leading position information.

10. A common channel signalling insertion/extraction device as claimed in claim 8, wherein said second items of information include route information indicating routes for respective incoming common channel signals, said low-speed side controller means includes means for decoding said route information to produce decoded route information, and means for generating said enabling signals in accordance with said decoded route information.

11. A common channel signalling insertion/extraction device as claimed in claim 8, wherein an item of said first items of information includes significant information and a digital signal transmission rate.

12. A common channel signalling insertion/extraction device for extracting incoming common channel signals from incoming digital signals and for inserting outgoing common channel signals in a digital signal to be transmitted, said digital signals having a series of frames, each frame containing a significant information signal and an associated common channel signal at a predetermined bit position within said frame, said common channel signal defining a digital signal transmission rate, said common channel signalling insertion/extraction device comprising:

a plurality of digital terminals each terminal having a digital signal side and a device side, said digital signal side terminating a dedicated digital line, said device side having a device side terminal input and a device side terminal output;

a multiplexer, having a multiplexer output for outputting a first multiplexed signal, and a plurality of multiplexer inputs, each multiplexer input connected to a device side terminal output;

channel means, connected to said multiplexer output, for transmitting there through said first multiplexed signal at a high-speed transmission rate;

a common channel signalling insertion/extraction circuit having a first input connected to said channel means to receive said first multiplexed signal at said high-speed transmission rate, a first output, a second input, a second output, means for extracting incoming common channel signals from said first multiplexed signal, and conversion means for outputting, via said first output, common channel signals at a low-speed transmission rate that is less than said high-speed transmission rate;

a demultiplexer, having a demultiplexer input coupled to said common channel signalling insertion/extraction circuit, and having a plurality of demultiplexer outputs, each demultiplexer output connected to a device side terminal input; and a common channel signalling controller circuit having an input connected to said first output of said common channel signalling insertion/extraction circuit, and an output connected to said second input of said common channel signalling insertion/extraction circuit, said common channel signalling controller circuit operating at a bit rate that is equal to said low-speed transmission rate, wherein said common channel signalling insertion/extraction circuit means includes:

a receiver-side buffer, connected between said first input and said first output, having means for buffering said incoming common channel signals;

a transmitter-side buffer, connected between said second input and said second output, having a transmitter-side buffer output and means for buffering said outgoing common channel signals;

a high-speed side controller, connected to said receiver-side buffer and to said transmitter-side buffer, for controlling high speed operations of said receiver-side buffer and said transmitter-side buffer; and a low-speed side controller, connected to said common channel signalling controller circuit, to said receiver-side buffer means and said transmitter-side buffer, for controlling low speed operations of said receiver-side buffer and said transmitter-side buffer, wherein:

said high-speed side controller includes means for (i) write enabling said receiver-side buffer at time points corresponding to predetermined bit positions in said incoming common channel signals so as to store in said receiver-side buffer said incoming common channel signals, and (ii) read enabling said transmitter-side buffer means at time points corresponding to predetermined bit positions of said outgoing common channel signals, so as to read out from said transmitter-side buffer said outgoing common channel signals means at time points corresponding to predetermined bit positions corresponding to said outgoing common channel signals; and wherein:

said low-speed side controller includes means for (i) read enabling said receiver-side buffer in synchronism with input/output operations of said common channel signalling controller so that said incoming common channel signals are read out from said receiver-side buffer to said common channel signalling controller in synchronism with input/output operations of said common channel signalling controller, and (ii) write enabling said transmitter-side buffer in synchronism with input/output operations of said common channel signalling controller, so that said outgoing common channel signals from said common channel signalling controller are stored in said transmitter-side buffer in synchronism with input/output operations of said common channel signalling controller.

13. A common channel signalling insertion/extraction device as claimed in claim 12, wherein said common channel signalling insertion/extraction circuit further includes a selector circuit, said selector circuit having a first selector input connected to receive outgoing common channel signal data from said transmitter-side buffer output, a second selector input for receiving significant information signals, a selector output, and means for multiplexing said outgoing common channel signal data with said significant information signals to provide a second multiplexed signal at said selector output.

14. A common channel signalling insertion/extraction device as claimed in claim 12, wherein said high-speed side controller further includes setting memory means for storing first items of information indicating respective bit positions of said incoming common channel signals within said frame of said first multiplexed signal and second items of information indicating respective leading positions of said incoming common channel signals for respective routes of said significant information signals received at and transmitted from said digital terminals.

15. A common channel signalling insertion/extraction device as claimed in claim 14, wherein:

said high-speed side controller further includes means for determining bit positions of incoming common channel signals within a frame of said first multiplexed signal according to said first items of information;

said high-speed side controller further includes means for write enabling said receiver-side buffer at addresses corresponding to respective incoming common channel signals at time points corresponding to said bit positions, such that said incoming common channel signals and said second items of information corresponding thereto are stored in said receiver-side buffer at said respective addresses;

said high-speed side controller further includes means for read enabling said transmitter-side buffer at addresses corresponding to respective outgoing common channel signals at time points corresponding to said bit positions, such that said outgoing common channel signals stored in said transmitter-side buffer at said respective addresses are read out therefrom at time points corresponding to said bit positions; and said low-speed side controller further includes means for reading said second items of information corresponding to respective outgoing common channel signals, for determining routes for respective common channel signals according to said second items of information, and for outputting enabling signals corresponding to said routes to said common channel signalling controller.

16. A common channel signalling insertion/extraction device as claimed in claim 15, wherein each of said second items of information includes a leading position information indicating a leading position in an incoming common channel signal for a corresponding route, said low-speed side controller further including means for updating said enabling signal in response to each change in said leading position information.

17. A common channel signalling insertion/extraction device as claimed in claim 15, wherein each of said second items of information include route information indicating routes for respective incoming common channel signals, said low-speed side controller includes further includes means for decoding said route information to produce decoded route information, and means for generating said enabling signals in accordance with said decoded route information.

18. A common channel signalling insertion/extraction device as claimed in claim 15, wherein an item of said first items of information includes significant information and a digital signal transmission rate.

* * * * *